United States Patent
Hanappe

(10) Patent No.: US 9,268,389 B2
(45) Date of Patent: Feb. 23, 2016

(54) REDUCING POWER CONSUMPTION ON A PROCESSOR SYSTEM BY MASKING ACTUAL PROCESSOR LOAD WITH INSERTION OF DUMMY INSTRUCTIONS

(75) Inventor: Peter Hanappe, Paris (FR)

(73) Assignee: Sony Corporation, Tokyo (JP)

( * ) Notice: Subject to any disclaimer, the term of this patent is extended or adjusted under 35 U.S.C. 154(b) by 611 days.

(21) Appl. No.: 13/636,824

(22) PCT Filed: Mar. 22, 2011

(86) PCT No.: PCT/EP2011/054355
§ 371 (c)(1),
(2), (4) Date: Feb. 4, 2013

(87) PCT Pub. No.: WO2011/117243
PCT Pub. Date: Sep. 29, 2011

(65) Prior Publication Data
US 2013/0132754 A1    May 23, 2013

(30) Foreign Application Priority Data
Mar. 23, 2010 (EP) .................................... 10305286

(51) Int. Cl.
*G06F 1/32* (2006.01)
*G06F 9/48* (2006.01)

(52) U.S. Cl.
CPC ................ *G06F 1/3228* (2013.01); *G06F 1/32* (2013.01); *G06F 1/329* (2013.01); *G06F 9/4893* (2013.01); *Y02B 60/144* (2013.01)

(58) Field of Classification Search
CPC ..... G06F 13/32; G06F 1/3203; G06F 1/3228; G06F 1/08
USPC ....................................................... 713/323
See application file for complete search history.

(56) References Cited

U.S. PATENT DOCUMENTS 4,977,529 A * 12/1990 Gregg ...................... G09B 9/00
                                                                                        376/245
5,475,847 A * 12/1995 Ikeda .................... G06F 1/3215
                                                                                          700/14
(Continued)

FOREIGN PATENT DOCUMENTS

| CN | 101379453 A | 3/2009 |
|---|---|---|
| CN | 101539799 A | 9/2009 |
| WO | WO 2007/103051 A2 | 9/2007 |

OTHER PUBLICATIONS

Office Action issued Jul. 22, 2013 in European Patent Application No. 11710748.2.

(Continued)

*Primary Examiner* — Chun Cao
*Assistant Examiner* — Santosh R Poudel
(74) *Attorney, Agent, or Firm* — Oblon, McClelland, Maier & Neustadt, L.L.P.

(57) ABSTRACT

Energy savings can be obtained by masking a computationally-intensive task from a processor performance management system which selects the processor performance state based on the load on the processor (CPU). By preventing the PPM system from reacting to the computational load the application places on the processor, the time to complete execution of the application increases but the energy used by the application may be greatly reduced and thermal stress on the CPU is also reduced (preventing noisy fans from operating). This approach makes it convenient to run a computationally intensive task as a background task. The masking can be achieved by running the task in tiny bursts, with micro-sleeps in between them, so that the average CPU load is low over a time period that the PPM system uses for measuring CPU activity/load.

17 Claims, 8 Drawing Sheets

(56) References Cited

U.S. PATENT DOCUMENTS

| | | | | |
|---|---|---|---|---|
| 5,887,178 | A * | 3/1999 | Tsujimoto | G06F 1/3228 713/322 |
| 5,887,179 | A * | 3/1999 | Halahmi | G06F 1/3287 712/E9.078 |
| 6,219,796 | B1 | 4/2001 | Bartley | |
| 6,800,965 | B1 * | 10/2004 | Turner | H01H 1/605 307/128 |
| 6,834,386 | B1 * | 12/2004 | Douceur | G06F 9/4881 718/102 |
| 6,848,054 | B1 * | 1/2005 | Watts, Jr. | G06F 1/206 307/34 |
| 7,036,030 | B1 * | 4/2006 | Altmejd | G06F 1/3228 713/322 |
| 7,765,543 | B1 * | 7/2010 | Weissman | G06F 9/485 714/48 |
| 7,814,485 | B2 * | 10/2010 | Morgan | G06F 1/3228 713/323 |
| 7,917,789 | B2 | 3/2011 | Fenger et al. | |
| 2003/0105983 | A1 * | 6/2003 | Brakmo | G06F 1/3203 713/320 |
| 2005/0120252 | A1 * | 6/2005 | Uwatoko | 713/300 |
| 2005/0138642 | A1 * | 6/2005 | Breh et al. | 719/318 |
| 2005/0149932 | A1 * | 7/2005 | Hasink | G06F 9/52 718/100 |
| 2005/0278520 | A1 * | 12/2005 | Hirai et al. | 713/1 |
| 2006/0015762 | A1 * | 1/2006 | Chiu | 713/340 |
| 2006/0080561 | A1 * | 4/2006 | Chaiken | G06F 1/3228 713/300 |
| 2006/0259799 | A1 * | 11/2006 | Melpignano et al. | 713/300 |
| 2007/0136726 | A1 * | 6/2007 | Freeland | G06F 11/3428 718/100 |
| 2007/0162160 | A1 * | 7/2007 | Chang et al. | 700/25 |
| 2008/0007222 | A1 * | 1/2008 | Nance | G01R 31/3693 320/128 |
| 2008/0198950 | A1 * | 8/2008 | Suyama | 375/340 |
| 2008/0307248 | A1 * | 12/2008 | Amano et al. | 713/600 |
| 2009/0048804 | A1 * | 2/2009 | Gary | G06F 1/3203 702/176 |
| 2009/0100437 | A1 * | 4/2009 | Coskun et al. | 718/105 |
| 2010/0185882 | A1 * | 7/2010 | Arnold et al. | 713/320 |
| 2011/0040940 | A1 * | 2/2011 | Wells et al. | 711/128 |
| 2011/0299317 | A1 * | 12/2011 | Shaeffer et al. | 365/106 |
| 2011/0307961 | A1 * | 12/2011 | de Perthuis | G06F 9/30145 726/26 |
| 2013/0125133 | A1 * | 5/2013 | Schuster | 718/105 |
| 2014/0337648 | A1 * | 11/2014 | Ujibashi | G06F 1/324 713/322 |

OTHER PUBLICATIONS

Anonymous, "HLT" Wikipedia, http://en.wikipedia.org/w/index.php?title=HLT&oldid=338320922, Jan. 17, 2010, 2 Pages.

"The annoying way that BOINC 'throttles'," http://www.spacekb.com/Uwe/Forum.aspx/seti2/1920/The-annoying-way-that-BOINC-throttles, Total 37 Pages, XP-002542532, (Nov. 20, 2007).

Jorden, "Setting Percentage of CPU Time, how does it work? (CPU throttling)," http://boincfaq.mundayweb.com/index.php?language=1&view=45&sessionID=calac42c76c3aa336a0ebd18ad4caa4e, Total 1 Page, XP-002642533, (Apr. 16, 2010).

International Search Report Issued Jul. 1, 2011 in PCT/EP11/54355 Filed Mar. 22, 2011.

Combined Chinese Office Action and Search Report issued Dec. 2, 2014 in Patent Application No. 201180015576.X (with English language translation).

* cited by examiner

REDUCING POWER CONSUMPTION ON A PROCESSOR SYSTEM BY MASKING ACTUAL PROCESSOR LOAD WITH INSERTION OF DUMMY INSTRUCTIONS

BACKGROUND OF THE INVENTION

The present invention relates in general to the field of energy efficiency in information technology, notably to improving energy efficiency when processor performance management (PPM), or dynamic frequency and voltage scaling (DFVS) as it is also called, is employed. In particular, the invention relates to a power saving technique that works by reducing the effect on a power performance management algorithm or system of a computational load that is associated with a particular process (notably, a user application, system-level service or "daemon").

Nowadays processor performance management is widely used in order to reduce the power consumption of computers and other devices/apparatus (especially portable devices—laptops, PDAs, mobile phones, etc.—which work using battery power for a large part of the time) containing a processor (notably a central processing unit, CPU). In this document the term "computing apparatus" shall be used as a general expression to designate devices/apparatus comprising a processor.

Modern processors are capable of functioning at a range of different clock frequencies and processor core voltages (Vcc). Each combination of an operating frequency and an operating voltage corresponds to a different standard of processor performance and is often referred to as a "performance state", or an "operating point", or a "P state" according to the Advanced Configuration and Power Interface standard (ACPI). Each performance state involves a different level of power consumption: the power consumption goes up in a linear fashion with CPU clock frequency and goes up with the square of the operating voltage. In other words, the following formula (1) is an approximation to how power consumption P varies with CPU clock frequency f and operating voltage V:

$$P=CV^2f \qquad (1)$$

where C is the processor capacitance.

As an example, Table 1 indicates the processor performance states that are supported by the 1.6 GHz Intel Pentium™ M processor.

TABLE 1

| Frequency | Voltage | |
|---|---|---|
| 1.6 GHz | 1.484 V | ←High Performance Mode (highest power consumption) |
| 1.4 GHz | 1.420 V | |
| 1.2 GHz | 1.276 V | |
| 1.0 GHz | 1.164 V | |
| 800 MHz | 1.036 V | |
| 600 MHz | 0.956 V | ←Low Performance Mode (lowest power consumption) |

Broadly speaking, processor performance management involves dynamically selecting a performance state for a processor based on the conditions applicable to the system at the time and/or based on a power management protocol which may have been specified by the user. Typically, a high performance state (highest possible operating frequency and voltage) will be selected when the percentage utilization of the processor is high and a power-saving low performance state (lowest possible operating frequency and voltage) will be selected when the percentage utilization of the processor is low, with intermediate states being selected in other circumstances.

The particular factors which influence the selection of processor performance state can be multiple, and vary from one system to another. Typical parameters which are taken into account include, but are not limited to: the processor utilization percentage (or processor "activity"), the user's power policy, the current battery level, and thermal conditions and events. Moreover, some PPM algorithms base their selection of processor performance state on predicted values of these parameters for an upcoming time period.

PPM can be implemented in a variety of ways, making use of features in the processor, BIOS and/or operating system. Examples of well-known PPM systems include AMD's powerNow!™, ARM's PowerWise Adaptive Voltage Scaling (AVS) and Intelligent Energy Manager (IEM), and Intel's Enhanced SpeedStep™ technologies.

One way of decomposing a PPM system is to consider that there is a control unit which decides on which processor performance state should be selected for a given time period, and a driver module which implements the desired setting of the processor performance state (for example, by writing a code into a register, internal to the processor, which identifies the next target processor performance state—as in the Intel SpeedStep™ system). In some cases the operating system may need to refer to the BIOS in order to determine the location of registers which hold the target processor performance state and/or the actual processor performance state. When the processor is instructed to change performance state, typically the processor will identify the desired operating voltage to an associated voltage regulator.

The present invention can be applied irrespective of the particular technique that is used to instruct a desired change in processor performance state and irrespective of the particular technique that is employed to implement an instructed change.

Often there will be a group of different power management policies and the user can select which policy he wishes the system to apply at a given time and/or can configure the policy. For example, the Microsoft Windows 7™ operating system specifies three power management policies (or "power plans") called, respectively, "Performance", "Balanced" and "Power Saver" and the user is allowed to customize these policies, for example, by specifying maximum and minimum limits on processor utilization in a given policy.

In many cases the system will operate in a PPM mode in which the load on the processor affects the performance state that is selected for the processor.

A computer (or other device having data processing capabilities) that is configured to implement a PPM policy which selects the processor performance state taking the processor activity into account will select a high performance processor state (i.e. high operating frequency and high operating voltage—with concomitantly high power consumption) whenever a computationally-intensive task is being processed. In general, the PPM module cannot distinguish between a high-priority task which should, indeed, be processed rapidly and a task which is non-urgent (i.e. where the user would tolerate slower completion of the task—i.e. a lower processor performance state—if this would lead to a reduction in power consumption).

In this regard, consider what happens when a computer user offers the resources of his system to a volunteer computing project, and his system is configured to implement a PPM policy which selects a processor performance state based, at least in part, on the computational load on the processor.

In volunteer computing, people contribute their computer resources to a large, and most often scientific, computing project. A well-known volunteer computing project is the climate modeling project run primarily by Oxford University via the climateprediction.net website.

In order to be able to participate in a volunteer computing project a user typically downloads a small application from a server associated with the volunteer computing project and installs this application on his computer. The application then downloads a block of data, performs a computation using the processor of the volunteered computer, uploads the result to the server, downloads the next block of data, and so on. Volunteer computing projects generally involve applications that are computationally-intensive, i.e. requiring the processor to perform mainly mathematical operations. Such applications are often referred to as "CPU-bound" applications.

In the most common case, volunteer computing applications are configured so that they execute only when the computer has been idle for a certain time, i.e. they run as a screen-saver. In order to evaluate the power consumption incurred in this kind of case (and others) a benchmark application was written, and this benchmark application was designed to perform a dummy computation so that it would mimic the behaviour of a CPU-bound user application. The benchmark application was run using the following apparatus: a Sony VAIO™ laptop (model PCG-Z1SP) using a 1500 MHz Intel Pentium™ M Banias processor featuring Speed-Step™ technology, using a GNU/Linux operating system with Linux kernel version 2.6.31 and configured so as to select the processor's performance state based on the percentage processor utilization.

When the benchmark application was run as a screen-saver on the above-described apparatus, the processor utilization (or processor load) was 100% during execution of the application (because it is a computationally-intensive application) and, accordingly, the PPM system selected the highest-performance processor state available. In these conditions about 57 seconds were required to complete the computation and roughly 1700 Joules of energy were used, making an average power consumption of 30 Watts. If the user is deliberately leaving his computer on purely so that a volunteer computing application can use his resources then all of this power is being consumed purely as a result of participation in the volunteer computing project.

By way of contrast, it is also possible to run a volunteer computing application (or other CPU-bound task) as a background task, for example while the user is using his computer for routine office work.

FIG. 1 illustrates the typical pattern of CPU activity when a user uses the above-mentioned laptop (configured as described) for routine office work. FIG. 1(a) illustrates an example of the typical pattern of variation in CPU load over time and FIG. 1(b) shows how the CPU clock frequency changes over the same time period under control of the PPM system (which is configured to select a high-performance processor mode when the CPU load is high but a low-performance processor mode when the CPU load is low).

It will be seen from FIG. 1(a) that average CPU load is low—generally below 20%—when the laptop is used for typical office work. FIG. 1(b) shows that the CPU's clock frequency also stays low, with occasional spikes to a higher frequency (for example, when the office application loads and decompresses an image). The power consumption when the laptop is used for routine office work is around 13 Watts which is practically the same as when the laptop is idle (i.e. CPU load close to zero).

When the benchmark application was run as a background task while the user was engaged in routine office work on the above-described test laptop configuration, the benchmark application made processor utilization jump to 100%, leading the PPM system to select a high-performance processor mode for the entire period when the benchmark application is being executed. The computation, once again, took about 57 seconds and over this time period the average power was 30 Watts. However, in this case it is fair to say that only 17 Watts "extra" power was being consumed over and above the power that the user would have required anyway in order to perform his routine office work (this represents a drop from 1700 Joules of energy used in the screen-saver case, to 969 Joules in the case of running in the background).

Thus, running a computationally-intensive application (or, more generally, a computationally-intensive task) as a background task while the user is engaged in using his computer is more energy-efficient than running the application as a screen-saver, but still involves expenditure of considerable additional energy.

Moreover, when the CPU-bound task was run in the background, raising the CPU load from a relatively low level to 100%, this soon placed a thermal stress on the CPU and the computer's fans started turning at full speed. The machine's noise soon became disturbing to the user and would be hard to tolerate for any extended period of time.

One approach that has been tried in the context of volunteer computing is to allow the user to restrict the fraction of time that his computer resources are available to the volunteer computing application. This functionality is provided by a software package called BOINC (Berkeley Open Infrastructure for Network Computing), which is often employed to deploy volunteer computing projects. If the user specifies that his computer resources are to be available to the volunteer computing project for less than 100% of the time then the BOINC manager will intermittently request the operating system to change the state of the application to "sleeping" so as to reduce the average CPU usage to the fraction specified by the user. For example, a user setting of 20% will lead the BOINC manager to run the application for 2 seconds and then "put the application to sleep" for 8 seconds on the assumption that, this being a computationally-intensive application, during the 2-second periods when the application runs the CPU load is 100%. When the application sleeps the CPU load will fall back to its idle level (or the level attributable to any other processes being executed by the CPU).

This facility that BOINC provides for a user to restrict the access that the volunteer computing application can have to the CPU does not lead to a reduction in the energy consumed by that application. This can be seen from the following:

let $\alpha$ be the user-setting of the allowed degree of CPU usage, where $0<\alpha\leq 1$;

$P_0$ is the power consumption when CPU load is 0% (the CPU is idle);

$P_{100}$ is the power consumption when CPU load is 100%;

$T_{100}$ is the time that would be taken to perform the computation with CPU load at 100% and if the computation was uninterrupted; and T is the actual time taken to complete the computation (including "sleep" periods).

The average power consumption should be $P=\alpha P_{100}+(1-\alpha)P_0$. However, the "extra" power consumption due to running the volunteer computing application (over and above the power used by the computer while idle) is only $P=\alpha(P_{100}-P_0)$.

Because of the sleeps introduced by BOINC the computation time grows from $T_{100}$ to $T=T_{100}/\alpha$. Thus, the total "extra" energy consumed because of the running of the volunteer computing application $E=P\times T$ becomes $(P_{100}-P_0)\times T_{100}$, which is exactly the same as would have been the case without the "sleeps".

In fact, it has been found in practice that when a computationally-intensive application's access to the CPU is restricted in this way the total energy consumed actually goes up. FIG. 2 shows how power consumption varied with the value of the parameter $\alpha$ (representing the proportion of the time the volunteer computing application has access to the CPU) in a case where a modified version of the benchmark application—adapted to reproduce the functionality provided by BOINC—was run on the test laptop configuration. FIG. 3 shows how computation time varied with the value of the parameter $\alpha$ in these experiments.

It can be seen from FIG. 2 that for almost all values of $\alpha$ the energy consumption is greater than for the case where there are no sleeps (i.e. the case where $\alpha=1$). Moreover, FIG. 3 shows that for all values of $\alpha$ less than one the duration of the computation increases. In other words, using the facility provided by BOINC to restrict CPU usage appears to result primarily in increased energy consumption and lengthening of the time required to complete the computation.

Moreover, it has been found that when the parameter $\alpha$ is set to a value greater than 0.2 in the BOINC preferences then the thermal stress on the CPU brings the fans into operation and the machine quickly becomes unbearably noisy.

It will be seen from the above that whether a volunteer computing application (or other CPU-bound task, e.g. a user application, a system-level service, a daemon in a multitasking operating system environment, etc.) runs as a screen-saver or as a background task there is a considerable extra expenditure of energy involved in running this application. Part of the reason for this significant energy usage resides in the fact that execution of the volunteer computing application involves a high percentage CPU utilization rate (at or approaching 100%) and this leads the PPM system to select a high-performance processor mode even though this application does not truly require high performance from the processor (the user has no real need for the task to be run quickly—he could tolerate an extension of the time that is required for execution of this task to be completed).

Considered more generally, a PPM system which selects processor performance state based, at last in part, on processor utilization, can consume power at a considerable rate even in a case where some part of the processor load which prompts the selection of a high-performance state was not, in fact, urgent or high priority for the user.

Obviously, if the only tasks liable to be executed by a processor are non-urgent then the user could select a power management profile which sets the processor into a low-performance/low power-consumption state at all times. However, this is not appropriate if the processor is going to be faced with some tasks that are urgent and others which are not urgent. In such circumstances the user is probably better off leaving in place a PPM profile which takes the CPU load into account when setting the processor performance state.

US 2009/0199019 describes a technique whereby a computer system (notably its operating system) is configured so that there is an explicit assignment of priority levels to different workloads so that the PPM algorithm can base its selection of the processor performance state not just on the percentage processor utilization but also on the priority level of the workload in question. However, in order for existing computer systems (or other devices having data processing capabilities) to be able to make use of this technique it would be necessary to update the operating system on each system/device. This is an impractical task given that numerous different types of operating systems (and different operating system versions) are currently in use.

BRIEF SUMMARY OF THE INVENTION

The present invention proposes a different approach for enabling a relatively low-performance processor state to be maintained in the case where the processor is faced with a task which, though computationally intensive, is not urgent for the user, i.e. a task for which he can tolerate a certain increase in the time required for completion of execution. Instead of tackling the problem at the level of the operating system, the present invention tackles the problem at the level of the tasks themselves, adapting tasks so that they are masked from the PPM system.

More particularly, the present invention describes the energy-consumption-reduction methods, the computer program products, the compilers and the computing apparatus defined in the claims appended hereto.

The techniques according to the present invention enable energy savings to be made when a computationally-intensive, but non-urgent task is run on a system employing a PPM algorithm which selects processor performance state based, at least in part, on the load on the CPU. The invention reduces the effect on the PPM algorithm of the computational load associated with execution of the task. In particular, the invention makes it more likely that the PPM system will maintain a relatively lower performance processor state than would have been the case if the PPM system had fully taken into account the computational load on the CPU associated with execution of the selected task. It can be considered that the CPU load associated with execution of the selected task has been fully or partially masked from the PPM system. This masking can enable a task to be executed using only a fraction of the energy that would normally have been required.

Moreover, the energy-saving techniques of the invention provide the advantage of reducing the thermal stress on a processor, reducing the amount of time it is necessary to run a cooling fan (with a concomitant reduction in noise).

The energy-saving techniques of the present invention are independent of the particular processor, operating system, PPM system or device architecture being employed and can be used with substantially any modern processor, operating system and/or device architecture provided that the relevant operating system and/or PPM system uses the CPU load as a heuristic to determine the processor power state.

The energy-saving techniques of the present invention can be applied even in the case of multi-core processors. If a task that is employing the masking techniques of the invention is being executed on a first processor core and happens to be migrated to a different processor core then there may be a short-term perturbation in the masking procedure but, at worst, this leads to a temporary increase in CPU load which soon abates.

BRIEF DESCRIPTION OF THE DRAWINGS

Further features and advantages of the present invention will become clear from the following description of a preferred embodiment thereof, given by way of example not limitation, in association with the accompanying drawings, in which.

DETAILED DESCRIPTION OF EMBODIMENTS OF THE INVENTION

Figure 1A:
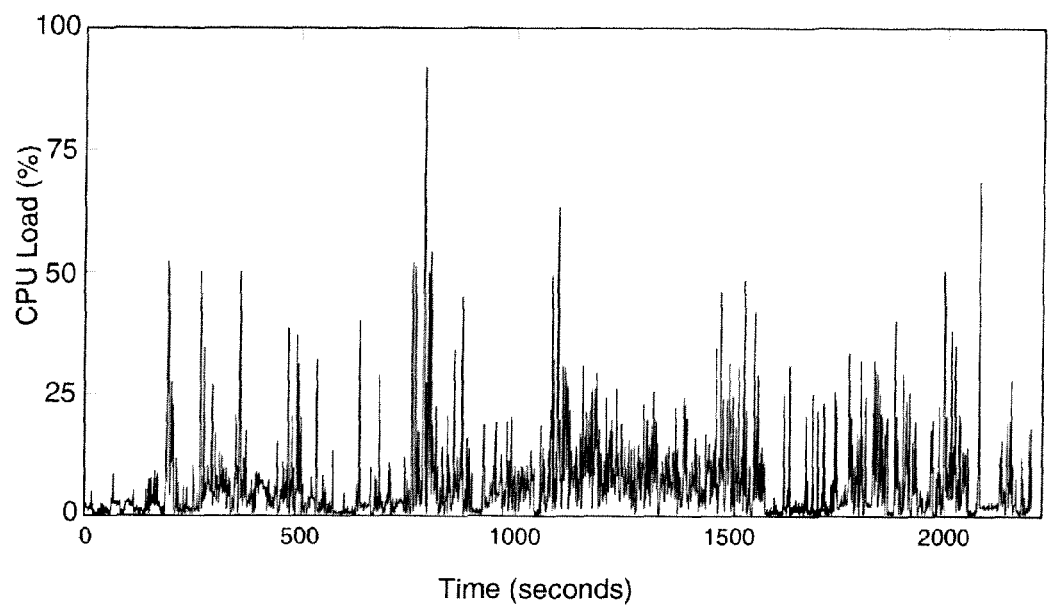
FIG. 1($a$) is a graph illustrating CPU load and FIG. 1($b$) is a graph showing CPU clock frequency in the case where a laptop is being used for routine office work.
Figure 1B:
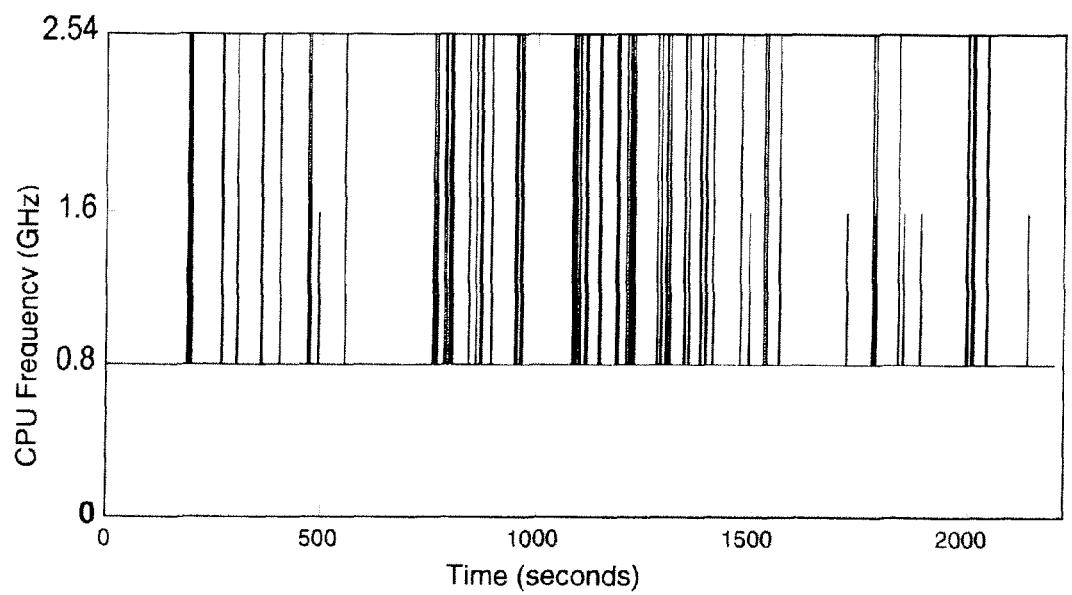
Figure 2:
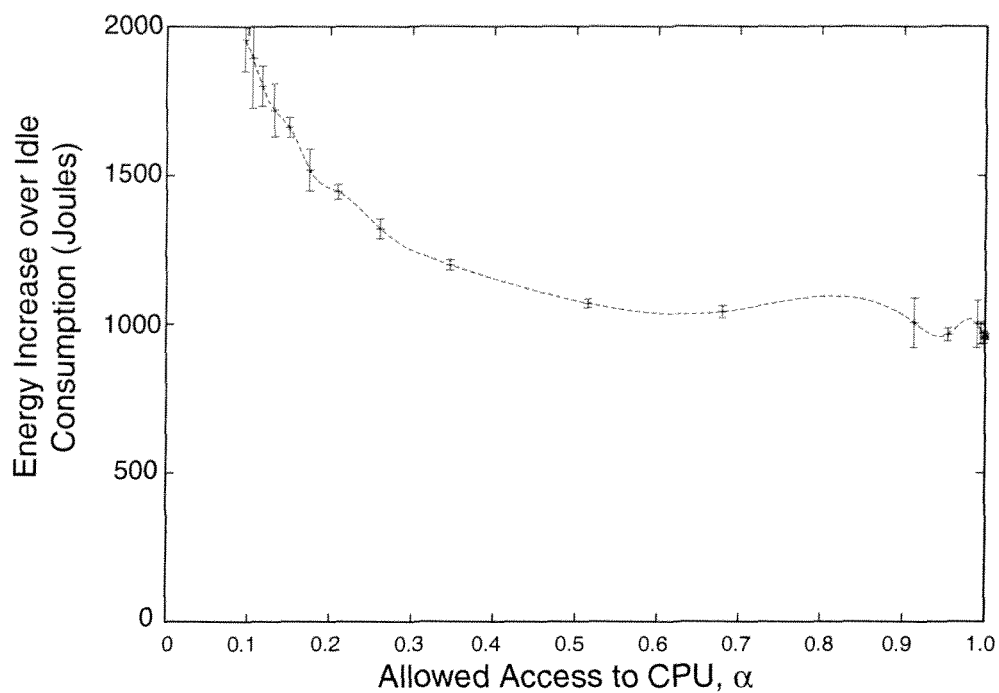
FIG. 2 is a graph illustrating how the energy consumed when a user application is run varies depending on a parameter α (the proportion of the time the CPU is allowed to execute the application according to options provided by the BOINC software package)
Figure 3:
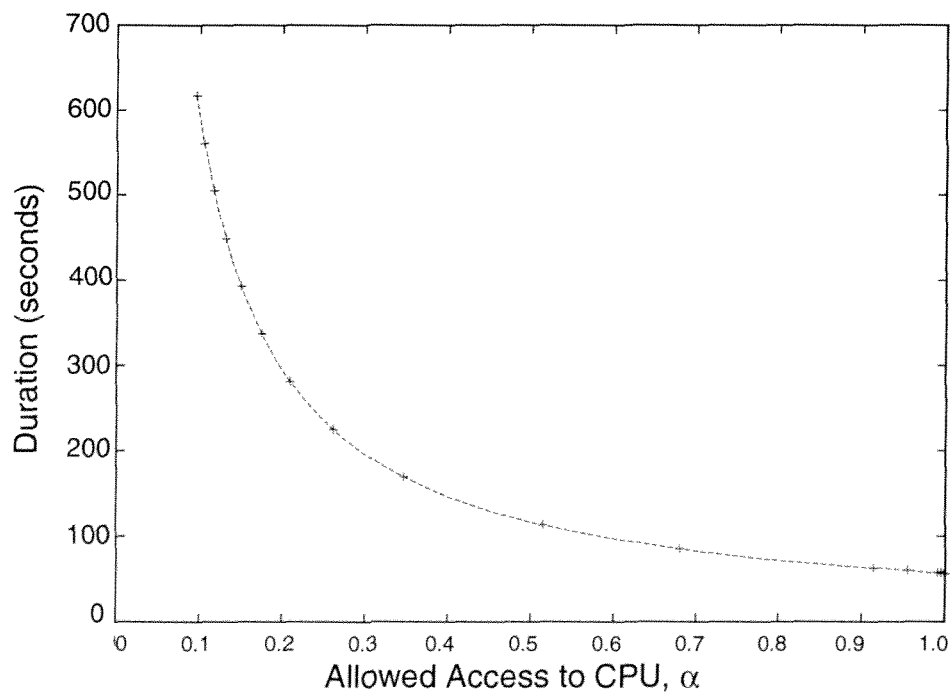
FIG. 3 is a graph illustrating how the computation time varies with the parameter α during the experiment of FIG. 2.

A first embodiment of the invention, which is presently preferred, will now be described with reference to FIGS. 4 to 7.

The detailed heuristics used by a PPM system to determine CPU load vary, notably from one type/version of operating system to another. For example, it is claimed that the Microsoft Windows 7™ operating system handles the accounting of processor activity in a new manner which enables greater accuracy when determining which performance state is appropriate based on the current system activity.

The present invention can be applied irrespective of the particular heuristics that a PPM system is using for evaluating CPU utilization, and is based on the concept that energy savings can be achieved while a PPM system is running according to a profile which selects processor performance state based at least in part on CPU utilization, by tricking the PPM system so that it maintains a relatively lower performance state for the processor even though the processor is executing a task or process which is CPU-bound.

The invention is based on the finding that, in general, PPM systems evaluate the CPU load at regular time intervals and decide which processor performance state to select based on the determined value for CPU load for a given time interval. According to the present invention, the average processor utilization associated with execution of a task is reduced over the accounting time period that the PPM system applies when determining CPU load, and so the PPM algorithm does not "see" the task (or only "sees" it partially). In other words, the computational load associated with execution of the task is made to have a reduced effect on the processor performance state selected by the PPM system.

In a first, preferred embodiment of the invention, the technique that is employed so that a task can reduce its CPU usage over each accounting time period used, by the PPM system, for evaluating CPU load is to arrange for the task to run over very short time periods, with regular short intervals between the active periods. By analogy with the approach used in BOINC, in the first preferred embodiment of the invention it could be considered that the task has "micro-sleeps" (i.e. tiny sleeps, use of the word "micro" here does not limit the duration of these tiny sleeps to microseconds).

In the case of the first preferred embodiment of the present invention the duration of the active periods and the intervals between them are set so that the average CPU load caused by the task over the PPM system's accounting periods is relatively low, and is unlikely to trigger selection of a higher performance state for the processor, but this reduced average CPU load is still non-zero, i.e. some progress is still being made on the computation. Thus, unlike the sleeps in BOINC, the micro-sleeps used in the first preferred embodiment of the invention do procure a reduction in energy consumption.

Indeed, BOINC cannot produce the timing granularity that is employed in the present invention. When the BOINC software package is used to deploy a volunteer computing application, that application must be compiled with a BOINC library that implements a signal handler. During execution of the application on the volunteered processor, the BOINC manager runs as a separate process and sends the application a signal at regular time intervals (using the inter-process communication facility provided by the operating system). When the signal handler receives the signal from the BOINC manager it checks how much time has elapsed and puts the application to sleep if necessary. This technique for putting the application to sleep is not capable of producing active periods and micro-sleeps of the short durations that are involved in the present invention.

FIGS. 4 to 7 demonstrate the efficacy of the approach according to the first preferred embodiment for obtaining energy savings. The above-described benchmark application was run on the test laptop configuration according to the pseudo code below:

```
start = now ( )
loop until work done
    do some work
    if (now( ) – start > T)
        sleep (S)
        start = now( )
    end if
end loop.
```

This pseudo code caused the benchmark application to access the processor to perform a small amount of work during a time period T, then to put itself to sleep during an interval S.

The values of T and S were varied so as to demonstrate the effects of the first preferred embodiment of the invention.

When S=0 this amounts to the benchmark application accessing the processor continuously, leading to an average CPU utilization of 100%, and a choice (by the PPM system) of a high-performance mode for the processor. This equates to screen-saver or conventional background execution as described above.

When both T and S are set to values that are large compared to the PPM system's accounting period, Pa (which is roughly 10 milliseconds in our example using GNU/Linux), then there are some PPM accounting periods (during active periods T) where the CPU usage is 100%, and other PPM accounting periods (during the sleeps S) where the CPU usage is 0%. Accordingly, high performance mode is selected during some of the time periods and low performance mode is selected for others. This equates to the behaviour obtained using the usage-restriction facility of BOINC, with no power savings.

Figure 4A:
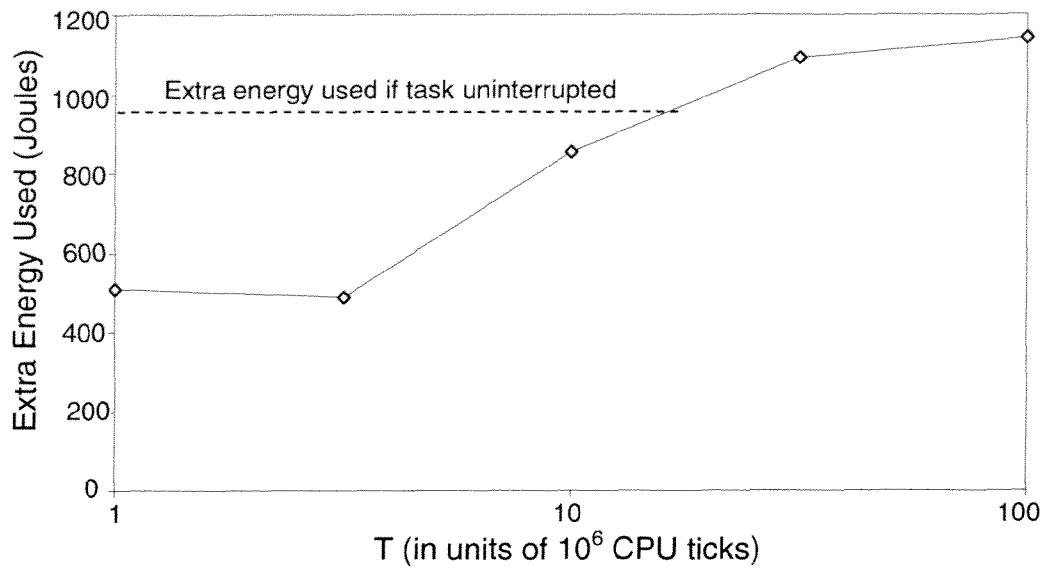
FIG. 4(a) is a graph illustrating how energy savings (when running a benchmark application) vary with changing values of parameters T and S.
Figure 4B:
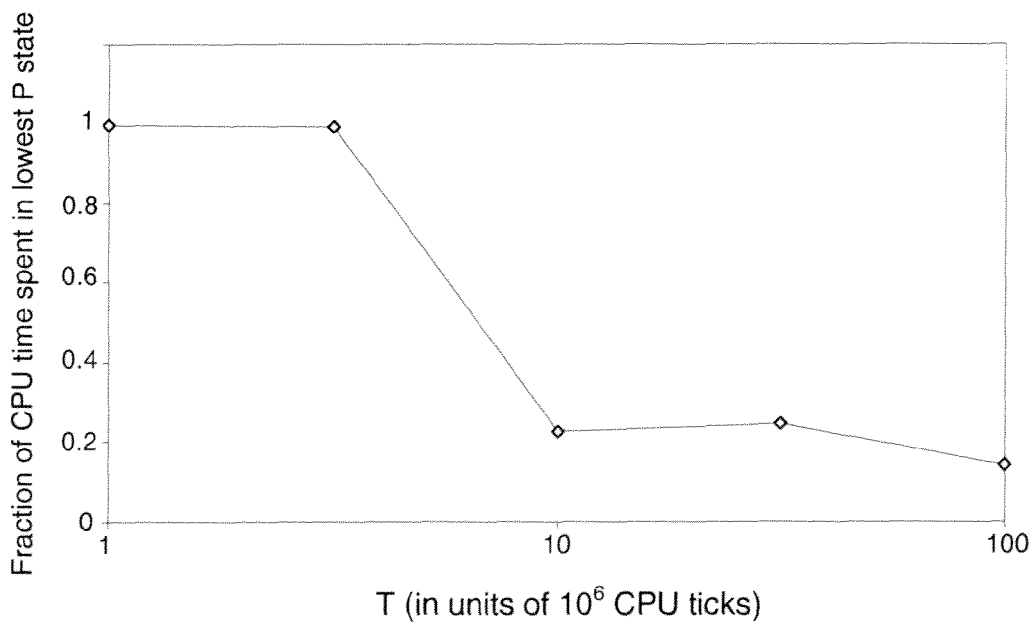
FIG. 4(b) is a graph showing how the percentage of time a processor stays in the lowest-power mode (when running the benchmark application) varies with changing values of T and S.

FIG. 4 illustrates the behaviour that was observed when T and S were set to different values larger and smaller than the accounting period Pa. FIG. 4(a) illustrates how energy usage varied with the values of T and S and FIG. 4(b) illustrates the effect that changing the T and S values had on the percentage of time the processor spent in the lowest power performance state.

Table 2 below lists the data points that are graphed in FIGS. 4(a) and 4(b)

TABLE 2

| Duration of T (No. CPU ticks) | Duration of S (Microseconds) | Duration of computation (seconds) | Fraction of time processor in lowest P state | Extra energy used (Joules) |
|---|---|---|---|---|
| 1000000 | 500 | 195.08 | 1 | 510.68 |
| 3162278 | 1581 | 188.166 | 0.994367 | 487.592 |
| 10000000 | 5000 | 138.008 | 0.228896 | 853.616 |
| 31622780 | 15810 | 121.149 | 0.246699 | 1091.573 |
| 100000000 | 50000 | 105.906 | 0.143248 | 1141.902 |

As can be seen from FIG. 1(a), when T was equal to or greater than about $10^7$ CPU ticks, which is roughly equal to the accounting period Pa in this example, then the extra energy required to run the benchmark application exceeded the 969 Joules of energy required to run the application uninterrupted in the background. Similarly, FIG. 4(b) shows that when T took values that were around $10^7$ CPU ticks ($\approx$Pa) then the processor did not spend much time in the performance state that uses lowest power.

However, when T and S were set to smaller values interesting behaviour was observed. Within a small range of values of S and T the average CPU load stayed below 100% during the PPM accounting periods, and so the PPM system did not increase the CPU performance state on behalf of the benchmark application, but useful progress on the computation was still being achieved.

FIG. 5 shows the results that were observed in this experiment when S was set to 500 microseconds and T was set to different values in the range from $10^5$ to $10^7$ CPU ticks, T was measured using the CPU time stamp counter that is provided on Intel-compatible processors. This counter is incremented every CPU clock tick and can be read using a single instruction without the intervention of the operating system.

Figure 5A:
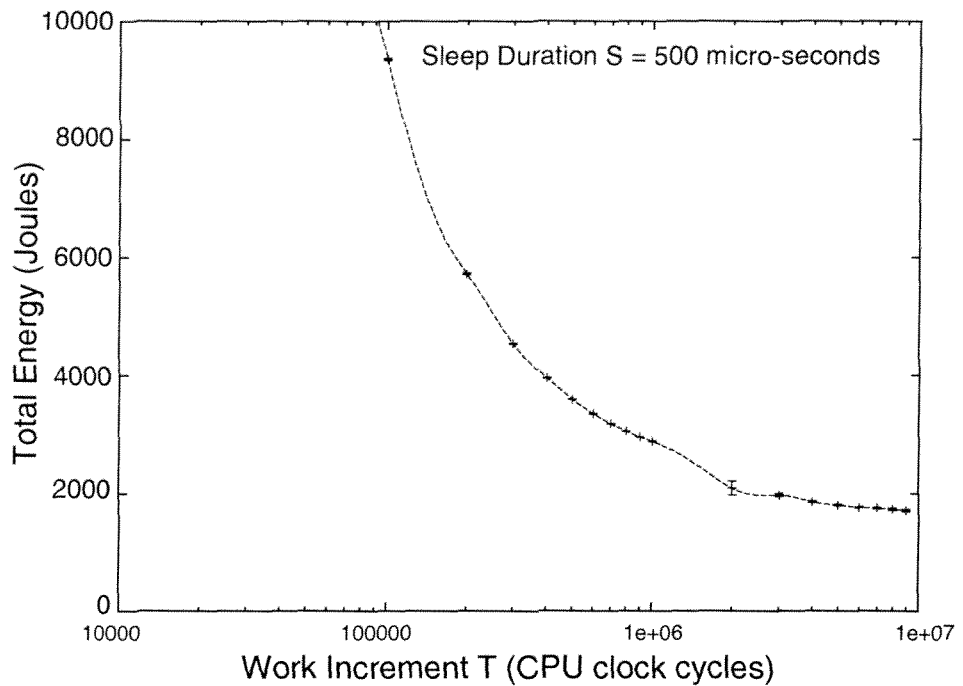
FIG. 5(a) illustrates how the total energy consumed running the benchmark application varied with the duration of an active period T during experiments illustrating the efficacy of the first preferred embodiment of the invention.
Figure 5B:
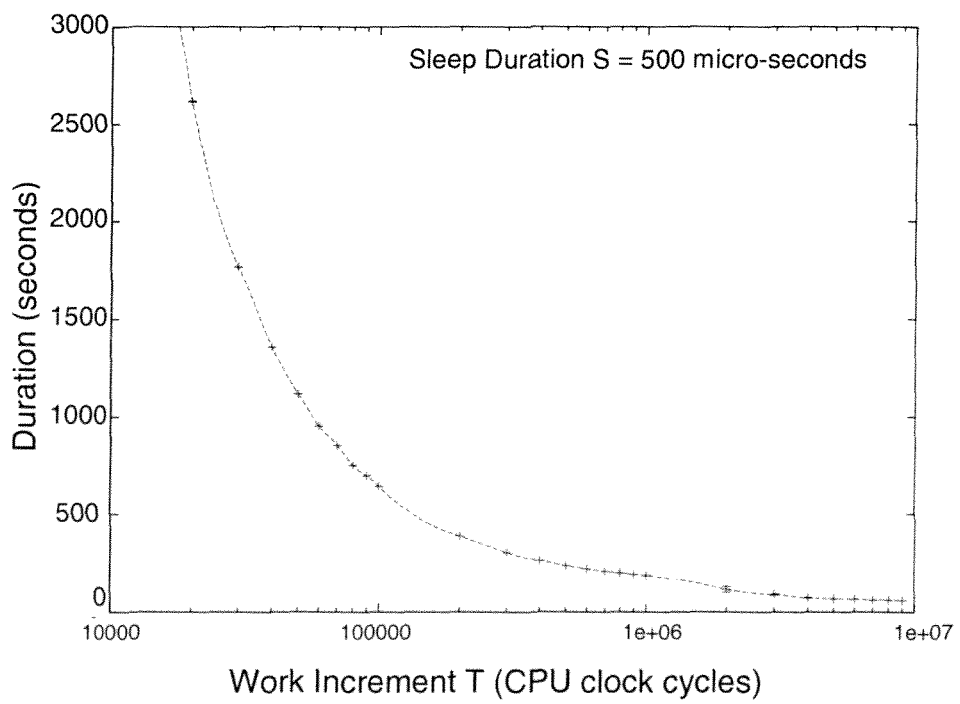
FIG. 5(b) illustrates how the time that was required in order to complete execution of the benchmark application varied with T in the experiments of FIG. 5(a)
Figure 5C:
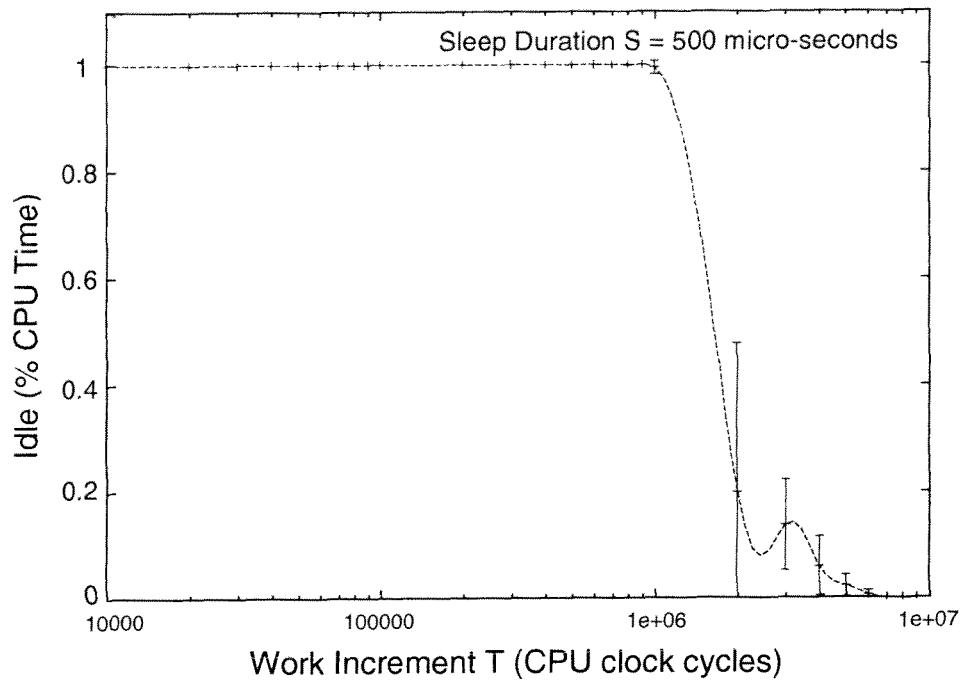
FIG. 5(c) shows the fraction of the time that the CPU was in low-power (idle) performance mode for different values of T in the experiments of FIG. 5(a)

FIG. 5(a) illustrates how the total energy that was consumed during the experiment varied with the value of T; FIG. 5(b) illustrates how the time that was required in order to complete execution of the benchmark application varied with T; FIG. 5(c) shows the fraction of the time that the CPU was in low-power (idle) performance mode for different values of T; and FIG. 5(d) illustrates how the extra energy consumption—attributable to execution of the benchmark application—varied with T.

Figure 5D:
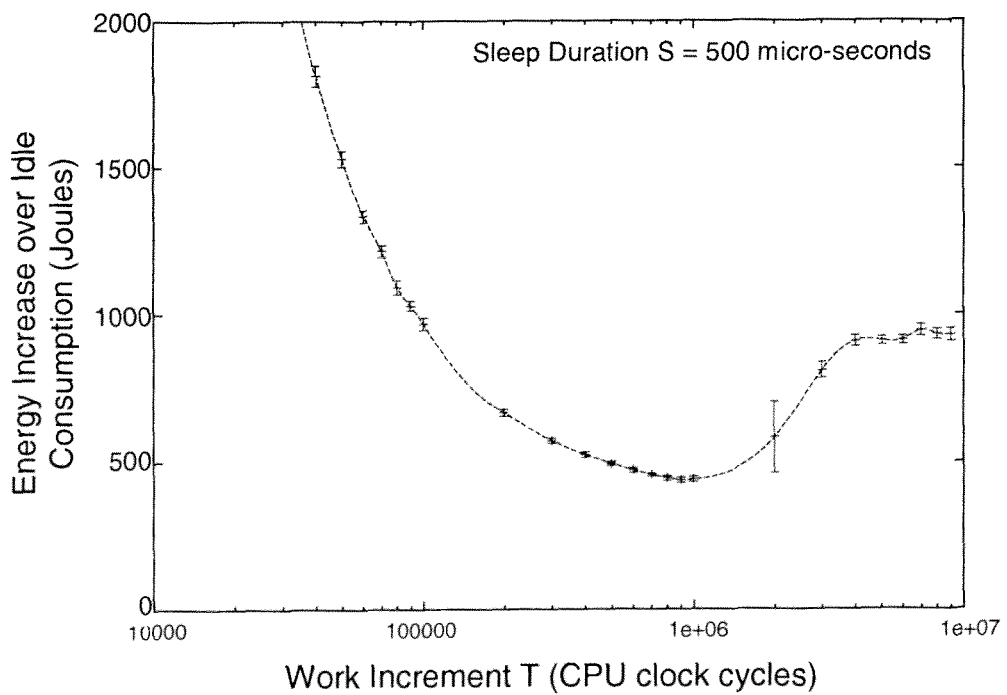
FIG. 5(d) illustrates how the extra energy consumption attributable to execution of the benchmark application varied with T in the experiments of FIG. 5(a)

FIG. 5(d) shows a clear minimum in the additional power consumption attributable to execution of the benchmark application. This minimum occurred when T was set to $10^6$ CPU clock ticks: the machine was still in a low-performance (low power/idle) mode yet useful work was still being done. The computation time stretched to 190 seconds—i.e. a little over 3 times the duration in the case of uninterrupted 100% CPU usage (whether run as a screen-saver or in the background)—but the total extra energy consumption attributable to running the benchmark application with micro-sleeps was less than 50% of the energy required in the full-power case where the benchmark application was run, uninterrupted, in the background. Moreover, compared to the case described above where the benchmark application was run uninterrupted in the background (at 100% CPU load) energy savings were observed using the micro-sleeps approach for all graphed values of T greater than 100000 CPU ticks. Although not illustrated on the graph of FIG. 5, it will be understood from FIGS. 4 and 5 that there is an upper limit on T, that is, T should be set less than the duration of the accounting period Pa, i.e. T<Pa, in order to ensure that the average CPU load imposed by this task is less than 100% during each accounting period.

FIG. 6 shows the results that were observed when T was set to $10^6$ CPU ticks and S was increased from 1 to 1000 microseconds in increments of 25 microseconds. FIG. 6(a) illustrates how the total energy that was consumed during the experiment varied with the value of S; FIG. 6(b) illustrates how the time that was required in order to complete execution of the benchmark application varied with S; FIG. 6(c) shows the fraction of the time that the CPU was in low-power (idle) performance mode for different values of S; and FIG. 6(d) illustrates how the extra energy consumption—attributable to execution of the benchmark application—varied with S.

FIG. 6 shows that for small values of the inactivity period S, in the range from 1 to 500 microseconds, the PPM system is confused and tends to flip the CPU from high-performance to low-performance states and back again. Indeed, if S is too small the operating system may replace the requested sleep function by an active loop, leading to an assessment of 100% CPU load. However, for inactivity periods S longer than 500 microseconds the behaviour stabilises, with the CPU being kept in a low-performance/low-power state and the energy consumption attributable to the execution of the benchmark application kept low.

Figure 6A:
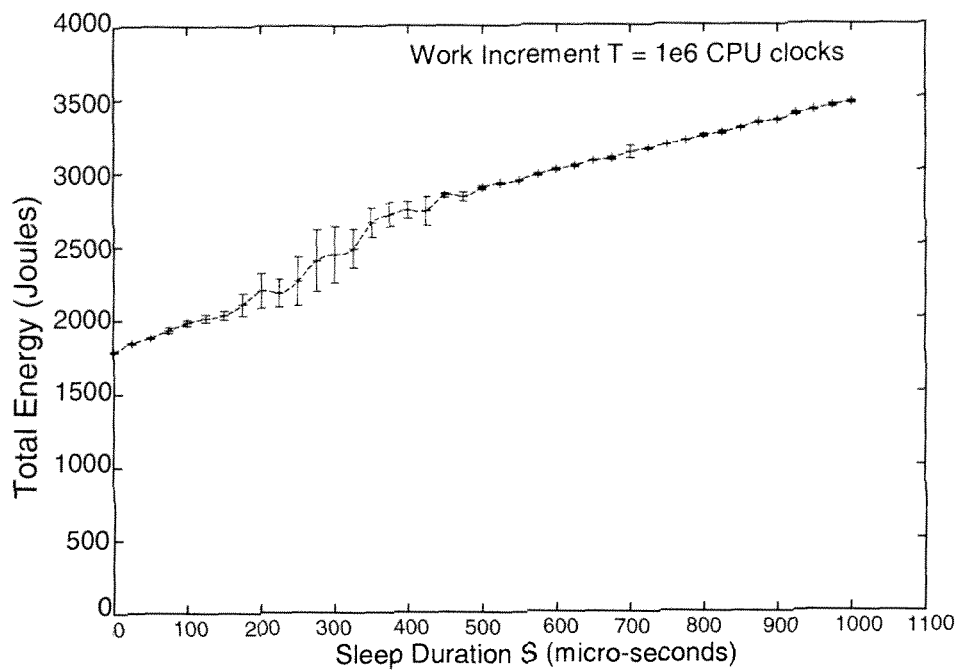
FIG. 6(a) illustrates how the total energy consumed varied with the duration of an interval S between active periods T during experiments illustrating the efficacy of the first preferred embodiment of the invention.
Figure 6B:
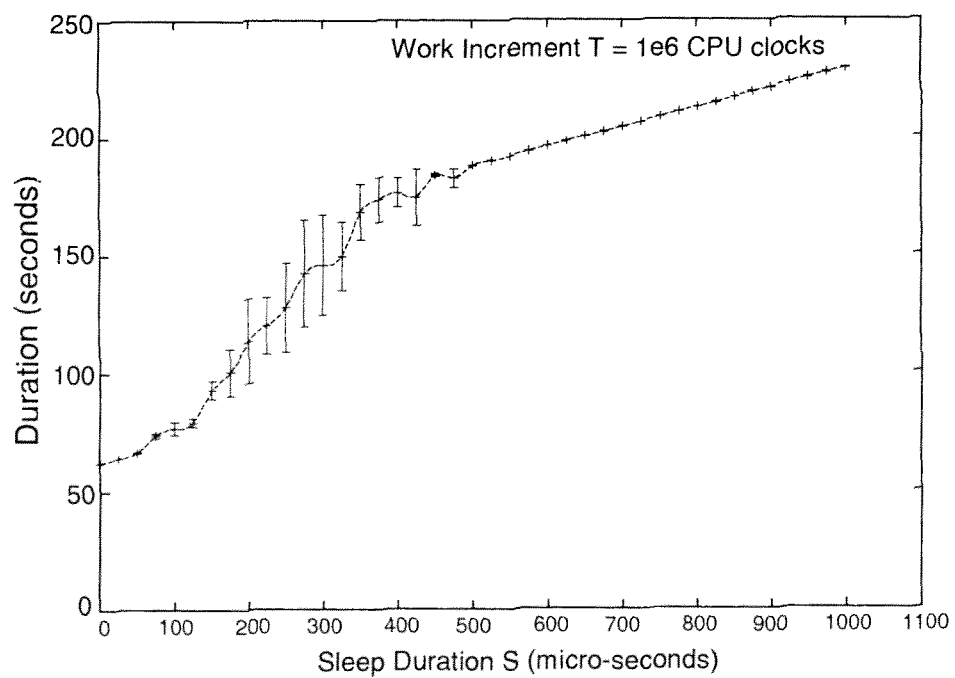
FIG. 6(b) illustrates how the time that was required in order to complete execution of a benchmark application varied with S in the experiments of FIG. 6(a)
Figure 6C:
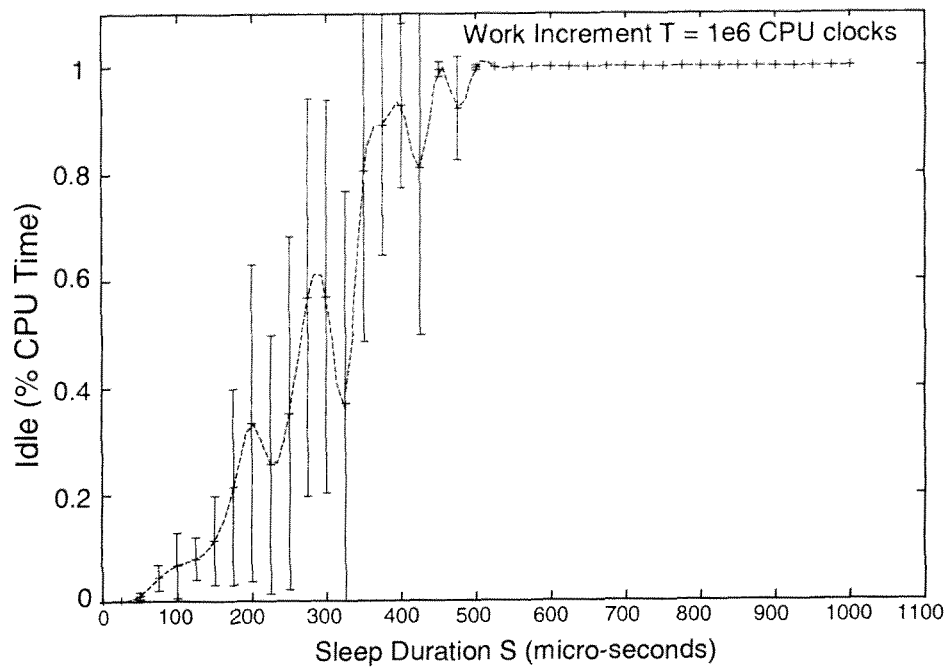
FIG. 6(c) shows the fraction of the time that the CPU was in low-power (idle) performance mode for different values of S in the experiments of FIG. 6(a)
Figure 6D:
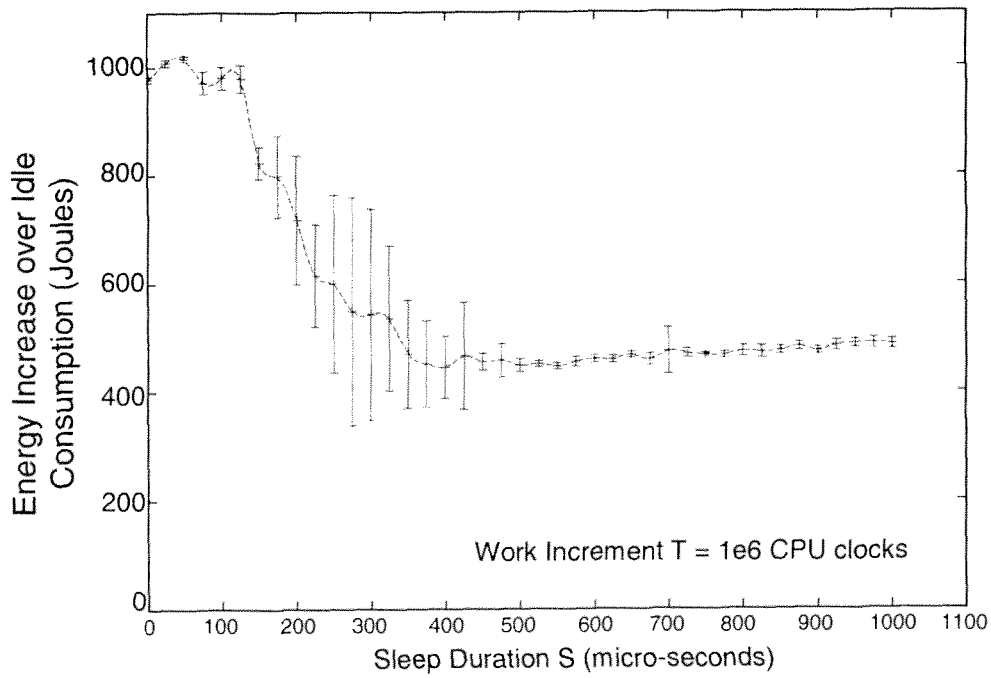
FIG. 6(d) illustrates how the extra energy consumption attributable to execution of the benchmark application varied with S in the experiments of FIG. 6(a)

It can be seen from FIG. 6(d) that in this experiment energy savings are obtained, compared to the case where the benchmark application runs in the background uninterrupted, for a small range of values of S between about 90 and about 100 microseconds and then at all graphed values of S above about 130 microseconds (even at low values where the PPM system is "confused" as described above). The lowest energy consumption is obtained for values of S between 500 and 600 microseconds, although similar energy savings are obtained even at greater values of S.

In theory, there is no upper limit on S; however the greater the duration of the tiny sleeps the longer it will take to complete the task of interest. Accordingly, in this particular experiment an optimal trade-off between energy saving and duration of the computation involves setting the sleep duration S in the range of 500 to 600 microseconds.

If a lower-than-optimum energy saving can be tolerated (as well as some fan noise), then faster execution of a task can be obtained by setting the value of S lower than the value which gives optimal energy-efficiency but sufficiently large that the average CPU load over the accounting period Pa will still be below 100%, e.g. in this experiment setting S between 90 and 100 microseconds or in the range from 130 to 500 microseconds.

In practice, the particular ranges of values of the active period T and of the inactivity period S that will provide optimum energy savings will vary from one situation to another dependent on the particular task and platform (processor, operating system, PPM system) being considered.

In the above experiments the benchmark application could be run for a power consumption of 15.3 Watts, this is only 2.3 watts above the machine's "idle" power consumption (13 Watts), and equates to 440 Joules of energy consumed. Although the computation takes about 3.3 times longer than in the cases where the benchmark application is run continuously, the above-described experiments show that the approach according to the first preferred embodiment of the invention enables 2.2 times less energy to be used than in the case where the same computationally-intensive application is run, uninterrupted, in the background and 3.8 times less than in the case where the application is run as a screen-saver.

There are numerous different ways of achieving the intermittent execution of a task in accordance with the first preferred embodiment of the invention, i.e. tiny periods of computation interleaved with tiny intervals of sleep. In the case of a user application or a system-level service (daemon), one simple technique which does not require any change to the original code consists in recompiling the application (or system-level service) using special compilation options so that every time the application (or service) invokes a function call the elapsed clock cycles are verified and, when it is found that the desired time T has elapsed, a tiny sleep (of duration S) is introduced. This can be achieved, for example, by exploiting profiling options available in many compilers and, in the experiment described below, an adapted version of the "mcount" profiling function available in the tools of the GNU operating system was used so as to introduce a tiny sleep every time a function call was invoked.

A second technique involves modifying the linear list of low-level instructions (which represent the task to be executed by the CPU) by insertion, at regular intervals in the instruction list, of a special function that tests the current value of T and which, when T reaches a desired value, puts the program to sleep for the selected period S.

A third technique consists in executing the application (system-level service, daemon, etc.) beforehand on a virtual machine that emulates the native CPU. The virtual machine can profile the code to find the CPU-intensive parts of the program, and generate a new instruction stream that runs natively (i.e. with the virtual layer) on the CPU and that has additional instructions to put the application to sleep at the selected intervals.

It is to be understood that the first preferred embodiment of the present invention is not limited by reference to the three techniques mentioned above: other suitable techniques will readily occur to the person skilled in the art.

Figure 7:
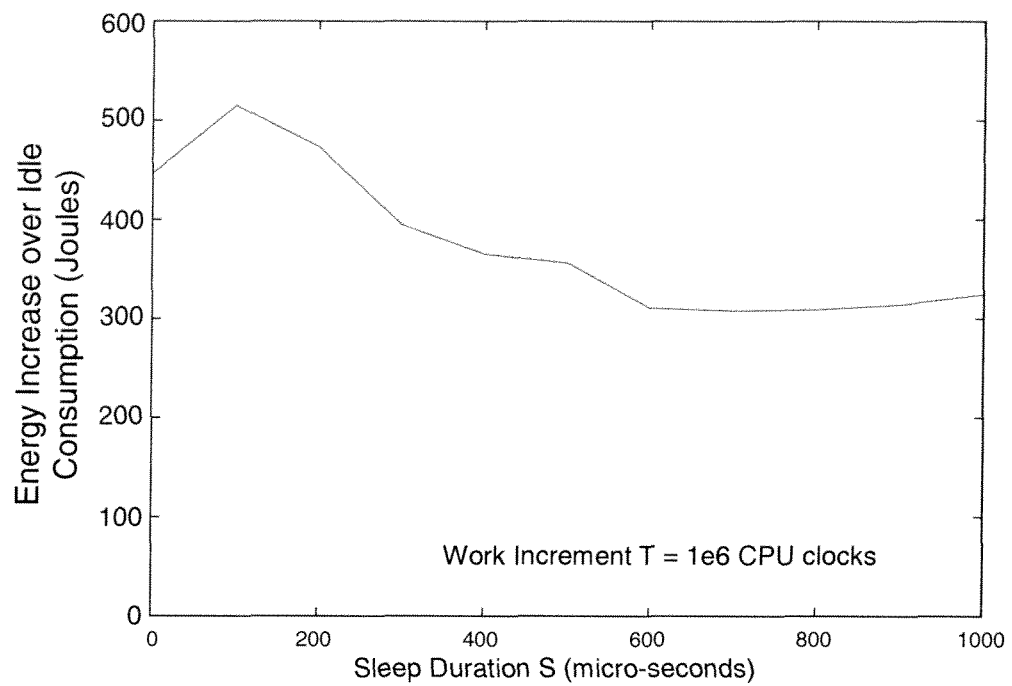
FIG. 7 illustrates how the extra energy consumption attributable to execution of a climate model varied with the interval S between active periods T.

A state-of-the-art climate modeling application was re-compiled according to the first of the three techniques mentioned above and run in the background using the above-described test laptop configuration. FIG. 7 illustrates how the energy consumption required by the re-compiled application varied for different values of S (duration of sleeps), when T (the duration of each tiny period of computation) was fixed at $10^{6.2}$ cycles of the processor clock. As FIG. 7 shows, for the optimal value of S (which was 700 microseconds in this case), the climate model required 308 Joules to complete and took 82.3 seconds. By way of contrast, when the same climate model was run on the test laptop configuration as a screen-saver this completed in 25.8 seconds but required 782.704 Joules of energy. Thus, the energy consumption required to execute the re-compiled application could be made 2.5 times less than the energy required to execute the same application as a screen-saver on the test laptop.

In the above-described experiments, different values of T and S were explored without explicit knowledge of the duration of the accounting period Pa being used by the PPM system. Indeed, the duration of the accounting period Pa can vary dynamically, notably when a Linux operating system is used (as in the test laptop configuration). When the techniques according to the present invention are applied to the design of a task, so that it can mask itself from a PPM system, a number of different approaches can be used in order to set appropriate values for T and S.

One approach consists in the software provider performing experiments ahead of time so as to determine what values of T and S provide good energy savings for the task in question when executed using various combinations of popular CPUs (or CPU families) and operating systems. The relevant values can then be listed, e.g. in a look-up table or database, and the task is then written or adapted so that is accesses the value that is listed for the CPU or CPU family and operating system on which it is trying to execute. This access can be provided directly, e.g. by hard-coding the value list into the task itself, or indirectly, e.g. by designing the task so that it fetches the appropriate values of S and T from a particular location (this could be a storage medium—CDROM, RAM, ROM, optical disc, etc.—or a location accessed over a network, e.g. the Internet, a LAN or WAN).

It is advantageous for the task to be designed so that it adapts the initial values of S and T that it has retrieved from the list, so as to optimize them. This can be achieved, for example, by designing the task to use heuristics such as CPU frequency to determine an appropriate adjustment to make to the initial S and T values that were retrieved from the list. Another technique consists in designing the task so that it can run a small benchmark process which determines optimum values of S and T starting from the initial retrieved values.

It has been found, in practice, that in many cases good results can be achieved by setting the value of S to roughly 500 microseconds (when a Linux operating system is used) or to 1000 microseconds (when a Windows™ operating system is used), then fine-tuning the value of T.

In a modification of the first preferred embodiment of the invention, it has been found advantageous to design the task so that, during execution of the task by the processor, the task adjusts the values of S and T in a dynamic manner, for example in order to speed up completion of the task if it becomes more urgent (at the price of limiting the energy savings that can be achieved). This can be particularly useful in applications where there is a deadline for obtaining completion of a computation.

For example, in some volunteer computing applications there is a deadline associated with each block of data that is supplied to a volunteer and it is necessary for the processed data to be returned to the server before the deadline expires. When the modification of the first embodiment of the present invention is applied to a volunteer computing application of that type then, if the task determines that the current values of T and S will result in completion of a given computation later than the deadline associated with the relevant block of data, then it can adjust the values of S and T so as to obtain faster completion of the task (in a very urgent case the value of S can be set to zero so that the computation continues to completion uninterrupted).

This functionality may be achieved in any convenient way. For example:

If the deadline for completion of a task is expressed as D, the time taken to complete the task with CPU load at 100% is designated $T_{100}$ and the time required to complete execution of the task with the CPU in low power mode is designated $T_{lp}$ and the fraction of the task that has been completed at a given moment t is designated δ (where 0≤δ≤1), then the task may be configured to make the following test at predetermined times during execution:

at the predetermined moment t, check the time to completion in low-power mode (i.e. determine the value of $(1-δ)×T_{lp}$);

compare the time to completion in low power mode [i.e. $(1-δ)×T_{lp}$] with the remaining time available before the deadline, i.e. compare with (D-t), allowing a safety margin of ΔT, to determine whether or not there is sufficient time left to complete the computation in low power mode; and if $[\{(1-δ)×T_{lp}\}+ΔT]<(D-t)$, then set S to zero, i.e. run the task continuously from now on (even though this will likely bring CPU load up to 100%, brining an end to the energy savings).

Often it is not possible to guarantee that the duration of the intervals S that will intervene between successive active periods when the task is executed in practice will conform to the values set by the task. This is because the task may request a sleep of a particular duration but the system may put the task to sleep for a somewhat longer period. However, this will not prevent the maintenance of a low-performance processor state.

The general principle of the present invention, whereby a task can be masked from a PPM system so as to make energy savings, can be implemented in a variety of ways, some of which exploit features specific to particular PPM systems and algorithms.

For example, WO2007/103051 proposes a PPM system in which the performance state of a processor is selected not only based on the CPU load but also taking into account a parameter quantifying the extent to which a task being executed is memory bound. In another example, US 2009/0089598 proposes a PPM system in which processor performance state is selected not only based on the CPU load but also based, at least in part, on an assessment of when the processor is stalled. According to these PPM systems, when a task is considered to be memory bound, or the processor is considered to be stalled during execution of a task, then a lower-performance state is selected for the CPU. A second embodiment of the present invention enables a task to mask itself from these types of PPM system. This is achieved by inserting dummy instructions into the task's code, tricking the feedback mechanisms of these PPM systems.

Any convenient dummy instructions may be inserted into the task's code to trick the feedback mechanisms of the above-described types of PPM system into deducing that the task is memory-bound. One example of a suitable dummy instruction consists in an instruction requesting the CPU to load data from a random (but valid) memory location into the CPU register, without there being any computational need for this data-load operation. While the CPU is loading the requested data into the register it is not making real progress on the task, so it can be considered that the task is, briefly, asleep. The greater the quantity of data that is read from the memory the longer the duration of this tiny sleep. Thus, the amount of data to be loaded controls the duration of the tiny sleep interval S.

In the second embodiment of the invention, changing the instruction flow of the task does not require any support from the operating system. Thus, as in the first embodiment, energy savings can be achieved by action performed at the level of a task, rather than action taken at the level of an operating system.

In the second embodiment of the invention, the same considerations apply when setting the duration of the active periods T and sleep intervals S as in the case of the first embodiment and so, for brevity, those features are not repeated here.

In the above-described first and second embodiments of the invention, it is assumed that even when a computationally-intensive task is being executed in the background a low-power/low-performance state of the CPU can be maintained by reducing the average CPU load that this particular task imposes on the CPU. However, the reduced CPU load being imposed by the background task is additional to any CPU load that is being imposed by other tasks that are being executed simultaneously (e.g. a foreground task that the user is engaged in). If these other tasks exert a CPU load of 100% then the background task is not causing any extra energy use. On the other hand, there may be situations where these other tasks by themselves did not impose sufficient CPU load to trigger use of a high-performance CPU state but the superposition of the background task does trigger the PPM system to select a high-performance state. It will be understood that this situation is extremely unlikely to hold true throughout the entire time period when the background task is being executed, so the first and second embodiments of the invention will produce useful energy savings. However, a third embodiment of the invention allows this situation to be avoided.

According to the third embodiment of the invention, a task is configured to execute in short active periods, with tiny sleep intervals in-between, using any of the methods described above in relation to the first and second embodiments and the task is further configured to change the values of S and T adaptively, based on an assessment of the average CPU load, so that the total load imposed by the load due to the current task added to the load imposed by other tasks remains below 100% during accounting periods Pa of the PPM system. This can be achieved by configuring the task to interrogate the operating system for information regarding the average CPU load and the amount of time the processor spends in a given P-state.

In general, the invention according to the first, second and third embodiments of the invention will find expression in program code representing a task (user application, system-level service, daemon, etc.) that has been designed, according to the principles discussed above, so that it masks itself from a PPM system by virtue of instructions that either form part of the program code ab initio or that form part of the code as a result of compilation of an earlier version of the task. Typically, this program code will be embodied as a computer program product comprising the specially-adapted program code recorded on a convenient physical medium (e.g. CDROM, RAM, ROM, optical disc, tape, or other storage medium). The program code may also be broadcast or transmitted over a network (e.g. LAN, WAN, the Internet, etc.).

However, according to a fourth embodiment of the invention selected tasks can be masked from a PPM system by a director application that is external to the task itself but which acts to mask selected tasks from the PPM system by introducing micro-sleeps into those tasks when they run. This director application does not form part of the operating system, it is an add-on that can, for example, be installed from a storage medium, downloaded from the Internet., etc. It is to be understood that the director application can implement the various features of the first to third embodiments that have been described above, except where obvious incompatibilities arise.

The invention has been described above with reference to certain presently-preferred embodiments thereof. The skilled person will readily understand that modifications and developments may be made in the preferred embodiments within the scope of the present invention as defined in the accompanying claims.

The invention has been described above in relation to embodiments which mask a user application from a PPM system. However, the same techniques can be applied to mask processes other than user applications, notably system level services (including printing, file-sharing, database services, etc.) and daemons in Unix and other multi-tasking operating systems, from a PPM system.

The invention has been described above with special reference to improving the energy efficiency of volunteer computing applications. However, the invention is applicable more widely to other tasks which are computationally intensive but are not necessarily urgent (e.g. rendering of a fractal, compression of video data after editing, video and audio coding and decoding, and many more).

The various embodiments of the present invention can be used in association with ancillary modules providing additional functionality. For example, in some cases a user interface may be provided so as to interact with a task which is masked from a PPM system using the techniques of the first to fourth embodiments of the invention. The user interface may allow the user to control various parameters of the masking process, notably one or more of the following: the values that are set for the duration of the active periods T and/or for the duration of the tiny sleep interval S, the source that the task should access in order to obtain suitable (initial) values for S and T, the time taken for completion of execution of the task, and the relative importance of energy saving compared to the time required for execution of the task. The user interface may allow the user to manually notify the task/masking process of details of the CPU and/or operating system on which the task is going to execute (e.g. identifying the CPU and operating system, specifying the CPU clock frequency, etc.).

What is claimed is:

1. A method of reducing energy consumed by a processor when executing a task in a background while a performance state of the processor is being controlled by a processor performance management (PPM) system that selects the performance state by taking into account an assessment of a processor load during an accounting period, the method of reducing energy comprising steps of:
   (a) causing the processor to execute a portion of the task during an active period,
   (b) after each active period, causing the processor to stop executing the task for an interval, and
   (c) repeatedly performing the steps (a) and (b) until the task has been completed;
   wherein durations of active periods and intervals are selected based on the task to be performed so that execution of the task imposes an average load on the processor that is less than 100% but greater than 0% during each accounting period of the PPM system between a start and an end of the execution of the task,
   wherein the step (b) comprises configuring instruction sequence of the task to include one or more dummy instructions and causing the processor to execute the one or more of said dummy instructions during said interval, and
   wherein said dummy instructions trick the PPM system that the task is memory bound.

2. The method of reducing energy according to claim 1, wherein the duration of each active period is less than a duration of the accounting period of the PPM system.

3. The method of reducing energy according to claim 2, wherein the task is configured so that, during execution, a check is made of time elapsed during a current period of execution and, when a predetermined duration has elapsed, a request is made to put the task to sleep for said interval.

4. The method of reducing energy according to claim 1 or 2, wherein the step (b) comprises putting the task to sleep for said interval.

5. The method of reducing energy according to claim 1, wherein the task is configured so that, during execution, a check is made of time elapsed during a current period of execution and, when a predetermined duration has elapsed, a request is made to put the task to sleep for said interval.

6. The method of reducing energy according to claim 5 or 3, wherein the task is configured so that said check of elapsed time is made each time the task invokes a function call.

7. The method of reducing energy according to claim 1, comprising a step of setting the durations of at least one of the active period and the interval dependent on the processor and an operating system being used to execute the task.

8. The method of reducing energy according to claim 1, wherein the durations of at least one of the active period and the interval is/are varied between the start and the end of the execution of the task.

9. A non-transitory computer-readable storage medium storing computer-readable instructions representing a task adapted to be implemented by a processor, a performance state of said processor being controlled by a processor performance management (PPM) system that selects the performance state for the processor by taking into account an assessment of a processor load during an accounting period, said computer-readable instructions, when executed by the processor, cause said processor to execute a method comprising:
   causing portions of said task to be executed by the processor during respective active periods with, in-between said active periods, intervals when the processor stops executing said task, wherein
   durations of the active periods and the intervals are selected based on the task to be performed,
   durations of the active periods and the intervals cause execution of the task to impose an average load on the processor that is less than 100% but greater than 0% during each accounting period of the PPM system between a start and an end of execution of the task,
   an instruction sequence of said task is configured to include one or more dummy instructions,
   the processor is caused to execute the one or more of said dummy instructions during the intervals, and
   said dummy instructions trick the PPM system that said task is memory bound.

10. The non-transitory computer-readable storage medium according to claim 9, further comprising:
   causing the task to be executed during the active periods of duration shorter than that of the accounting period.

11. A computing apparatus comprising a processor and configured to implement processor performance management (PPM) of selecting a processor performance state by taking into account an assessment of a processor load during an accounting period, wherein the computing apparatus is configured to execute a selected task by repeatedly executing a portion of the selected task during an active period and, after each active period, stopping execution of the selected task for an interval, wherein durations of active periods and intervals are selected based on the selected task to be performed so that the execution of the selected task imposes an average load on the processor that is less than 100% but greater than 0% during each accounting period of a PPM system between a start and an end of the execution of the selected task, wherein an instruction sequence of the selected task is configured to include one or more dummy instructions, the processor is caused to execute the one or more of said dummy instructions during the interval, and said dummy instructions trick the PPM system that said task is memory bound.

12. The computing apparatus according to claim 11, wherein the duration of the active periods is shorter than that of the accounting period.

13. A non-transitory computer-readable storage medium storing computer-readable instructions representing a task to be executed on a processor, a processor performance state being controlled by a processor performance management (PPM) system that selects the processor performance state by taking into account a processor load during an accounting period, said computer-readable instructions, when executed by the processor, cause the processor to perform steps of:

(a) running for an active period;

(b) after each active period (T), stopping running for an interval; and (c) repeating the steps (a) and (b) until execution of the task is complete;

wherein durations of active periods and intervals are selected based on the task to be performed, wherein the durations of the active periods and the intervals cause the execution of the task to impose an average load on the processor that is less than 100% but greater than 0% during each accounting period of the PPM system between a start and an end of the execution of the task, wherein the step (b) comprises configuring instruction sequence of the task to include one or more dummy instructions and causing the processor to execute the one or more of said dummy instructions during said interval, and wherein said dummy instructions trick the PPM system that the task is memory bound.

14. The non-transitory computer-readable storage medium according to claim 13, wherein the duration of the active periods is shorter than that of the accounting period.

15. The non-transitory computer-readable storage medium according to claim 13, further comprising steps of:

each time the task invokes a function call, verifying elapsed clock cycles, and when the verifying step shows that the task has been active on the processor for said active period, putting the task to sleep for said interval.

16. A non-transitory computer-readable storage medium storing computer-readable instructions to control execution of a task by a processor of a computing apparatus, a performance state of the processor being controlled by a processor performance management (PPM) system that selects the performance state by taking into account a processor load during an accounting period, said computer-readable instructions, when executed by the processor, causes the processor to perform steps of:

(a) executing said task for an active period;

(b) after each active period, stopping execution of said task for an interval; and (c) repeating the steps (a) and (b) until the execution of the task is complete;

wherein durations of active periods and intervals are selected based on the task to be performed, wherein the durations of the active periods and the intervals cause the execution of the task to impose an average load on the processor that is less than 100% but greater than 0% during each accounting period of the PPM system between a start and an end of the execution of the task, wherein the step (b) comprises configuring instruction sequence of the task to include one or more dummy instructions and causing the processor to execute the one or more of said dummy instructions during said interval, and wherein said dummy instructions trick the PPM system that the task is memory bound.

17. The non-transitory computer-readable storage medium according to claim 16, wherein the duration of the active periods is shorter than that of the accounting period.

\* \* \* \* \*